(12) United States Patent
Chen et al.

(10) Patent No.: US 9,893,524 B2
(45) Date of Patent: Feb. 13, 2018

(54) COORDINATED CONTROL METHOD OF GENERATOR AND SVC FOR IMPROVING POWER THROUGHPUT AND CONTROLLER THEREOF

(71) Applicant: ABB Schweiz AG, Baden (CH)

(72) Inventors: Yao Chen, Beijing (CN); Guoju Zhang, Beijing (CN); Charles Sao, Vasteras (SE)

(73) Assignee: ABB Schweiz AG, Baden (CH)

( * ) Notice: Subject to any disclaimer, the term of this patent is extended or adjusted under 35 U.S.C. 154(b) by 452 days.

(21) Appl. No.: 14/374,559

(22) PCT Filed: Dec. 20, 2012

(86) PCT No.: PCT/CN2012/087001
§ 371 (c)(1),
(2) Date: Jul. 25, 2014

(87) PCT Pub. No.: WO2014/094271
PCT Pub. Date: Jun. 26, 2014

(65) Prior Publication Data
US 2014/0379152 A1    Dec. 25, 2014

(51) Int. Cl.
*G05D 3/12*   (2006.01)
*H02J 3/18*   (2006.01)
(Continued)

(52) U.S. Cl.
CPC ............ *H02J 3/1821* (2013.01); *G05B 15/02* (2013.01); *G05F 1/70* (2013.01); *H02J 3/18* (2013.01);
(Continued)

(58) Field of Classification Search
None
See application file for complete search history.

(56) References Cited

U.S. PATENT DOCUMENTS

| | | | | | |
|---|---|---|---|---|---|
| 4,234,842 | A | * | 11/1980 | Brennen | .................. H02J 3/18 323/210 |
| 4,743,832 | A | * | 5/1988 | Brennen | ............... H02J 3/1864 323/211 |

(Continued)

FOREIGN PATENT DOCUMENTS

| | | |
|---|---|---|
| CN | 101692579 A | 4/2010 |
| CN | 101924370 A | 12/2010 |

(Continued)

OTHER PUBLICATIONS

Supplementary European Search Report, EP12890592, Jul. 28, 2016, ABB Technology Ltd., 7 pages.

(Continued)

*Primary Examiner* — Adam Lee
(74) *Attorney, Agent, or Firm* — Taft Stettinius & Hollister LLP

(57) ABSTRACT

The present invention provides coordinated control methods of generator and SVC for improving power plant active power throughput and controller thereof. The method comprises: measuring the required input parameters for the generator and SVC control; judging the system topology and the control mode of SVC to determine the operation mode; and calculating the control reference based on the operation mode to control the generator and/or SVC. The proposed methods and coordinated controllers enable the SVC to share the required reactive power output of the power plant, convert the generator into "unity-power-factor-generator", and therefore extend the active power output capability of the power plant.

28 Claims, 7 Drawing Sheets

(51) Int. Cl.
*G05B 15/02* (2006.01)
*H02P 9/14* (2006.01)
*G05F 1/70* (2006.01)
*H02P 9/30* (2006.01)

(52) U.S. Cl.
CPC .............. *H02J 3/1814* (2013.01); *H02P 9/14* (2013.01); *H02P 9/30* (2013.01); *Y02E 40/12* (2013.01); *Y02E 40/18* (2013.01)

(56) References Cited

U.S. PATENT DOCUMENTS

| | | | | | |
|---|---|---|---|---|---|
| 4,891,570 | A * | 1/1990 | Nakamura | ............ | H02J 3/1864 323/210 |
| 5,703,791 | A * | 12/1997 | Amano | ..................... | H02J 3/24 322/20 |
| 5,907,234 | A * | 5/1999 | Sadek | ................... | H02J 3/1864 323/210 |
| 6,329,773 | B1 * | 12/2001 | Xia | ......................... | H02P 9/305 318/140 |
| 6,476,521 | B1 * | 11/2002 | Lof | ............................ | H02J 3/24 307/102 |
| 6,559,561 | B1 * | 5/2003 | Angquist | .................. | H02J 3/24 307/102 |
| 6,670,721 | B2 * | 12/2003 | Lof | ........................ | F03D 9/003 290/2 |
| 2002/0103629 | A1 * | 8/2002 | Kutzner | ................. | G05B 17/02 703/7 |
| 2006/0044850 | A1 * | 3/2006 | Wu | ........................... | H02J 3/01 363/41 |
| 2008/0077368 | A1 * | 3/2008 | Nasle | ..................... | G05B 17/02 703/4 |
| 2008/0157728 | A1 * | 7/2008 | Toki | ...................... | H02J 3/1864 323/210 |
| 2008/0290666 | A1 * | 11/2008 | Bourgeau | ................ | H02P 9/006 290/40 A |
| 2009/0160187 | A1 * | 6/2009 | Scholte-Wassink | .. | F03D 7/0284 290/44 |
| 2009/0206606 | A1 * | 8/2009 | Jorgensen | ............. | F03D 7/0224 290/44 |
| 2009/0251111 | A1 * | 10/2009 | Choy | ........................ | H02J 3/18 322/20 |
| 2009/0278351 | A1 * | 11/2009 | Rivas | .................... | F03D 7/0224 290/44 |
| 2010/0001698 | A1 * | 1/2010 | Johnson | ................ | H02J 3/1864 323/209 |
| 2011/0049903 | A1 * | 3/2011 | Jorgensen | ............. | F03D 7/0224 290/55 |
| 2011/0068631 | A1 * | 3/2011 | Roscoe | ..................... | H02J 3/38 307/69 |
| 2011/0181044 | A1 * | 7/2011 | Scott | ..................... | H02J 3/1864 290/7 |
| 2012/0139506 | A1 | 6/2012 | Matsuda et al. | | |
| 2013/0051105 | A1 * | 2/2013 | Wang | ................... | H02M 7/5387 363/132 |
| 2013/0134779 | A1 * | 5/2013 | Watanabe | .................. | G05F 1/70 307/24 |
| 2013/0134789 | A1 * | 5/2013 | Panosyan | .............. | H02J 3/1835 307/84 |
| 2013/0200691 | A1 * | 8/2013 | Crane | .................... | B63H 23/24 307/9.1 |
| 2014/0049229 | A1 * | 2/2014 | Li | ............................ | H02J 3/32 322/39 |
| 2014/0111167 | A1 * | 4/2014 | Hyypio | ...................... | H02P 9/14 322/20 |
| 2015/0054830 | A1 * | 2/2015 | Inuzuka | ................ | H02J 13/001 345/440 |

FOREIGN PATENT DOCUMENTS

| | | |
|---|---|---|
| CN | 102299527 A | 12/2011 |
| CN | 202142865 U | 2/2012 |
| CN | 102480130 A | 5/2012 |
| CN | 102545241 A | 7/2012 |
| CN | 102668295 A | 9/2012 |
| CN | 102723781 A | 10/2012 |
| WO | WO2011091267 A2 | 7/2011 |

OTHER PUBLICATIONS

ISA/CN International Search Report issued Sep. 26, 2013 re PCT Application No. PCT/CN2012/087001, filed Dec. 20, 2012.
First Office Action issued Dec. 3, 2015 re Chinese Counterpart Application of ABB, Serial No. 201280058797.X (English translation/explanation of relevant portions of action).

* cited by examiner

COORDINATED CONTROL METHOD OF GENERATOR AND SVC FOR IMPROVING POWER THROUGHPUT AND CONTROLLER THEREOF

RELATED APPLICATION

This application is a national filing of PCT application Serial No. PCT/CN2012/087001, filed Dec. 20, 2012.

FIELD OF INVENTION

The invention relates to the technical field of door entry system, and more particularly to a coordinated control method of generator and SVC (static Var compensator) for improving power plant active power throughput and controller thereof.

BACKGROUND OF INVENTION

With the ever increasing electrical power load, power generation capacity needs to be scaled up accordingly to always achieve a balance between generation and consumption. No matter for existing or new power plants, it is always desirable to make fully utilization of the generation facilities.

Installing variable frequency drives for large-scale auxiliary motors of the power plant is the most commonly adopted way in industry to achieve this target which can help to reduce the in-house load considerably. Another solution is to reduce the reactive power consumption of the auxiliary system, which also allows the generator to produce more active power while still maintaining the same level of reactive power support to the grid. However, the auxiliary system only counts for a small part of the generation capacity, e.g. around 10% for coal-fired power plants, which limits the potential contribution from the above mentioned solutions in terms of power plant active power output capability improvement.

The present invention proposes a novel solution to achieve this target from generator point of view, i.e. to install SVC at the generation side to share the required reactive power output of the power plant. The main circuit topologies have been disclosed in prior art, such as a PCT application: PCT/US2011/181044, entitled "Method and Apparatus for Improving Power Generation in a Thermal Power Plant", which was filed on Jan. 21, 2011. Thereafter, the foregoing patent application is incorporated herein by reference.

By operating the generator and the SVC to control the power factor of the generator to improve the active power capability of the power plant, at least three problems need to be solved:

The control references obtained by the coordination controller depend on multiple factors, like the main circuit topologies, the primary controls adopted by the generator and the SVC, etc. While at present no prior art mentions how to ensure the generalization of the designed coordination controller by taking different possible factors into consideration.

The required reactive power output of the SVC varies along with the operation status of the generator and the power system which are connected to the SVC. No prior mentions how to determine the operation point of the SVC to make the generator run at unity power factor in the full operation range.

The third problem to be solved is how to ensure the performance of the coordination controller, which mainly refers to the following two aspects: to guarantee the accuracy based on the accessible information, and to achieve fast response speed without affecting the stable operation of the generator.

Due to the above mentioned problems, a control method for coordinating generator and SVC and a controller thereof are proposed to improve power plant active power throughput in the present invention.

SUMMARY OF INVENTION

To overcome the problems mentioned above, the present invention proposes a coordinated control method of generator and SVC for improving power plant active power throughput and controller thereof; which enable the SVC to share the required reactive power output of the power plant, convert the generator into "unity-power-factor-generator", and therefore extend the active power output capability of the power plant.

According to an aspect of the present invention, it provides a coordinated control method of generator and SVC for improving power plant active power throughput. The coordinated control method comprises: measuring the required input parameters for the generator and SVC control; judging the system topology and the control mode of SVC to determine the operation mode; and calculating the control reference based on the operation mode to control the generator and/or SVC.

According to a preferred embodiment of the present invention, the operation mode can be divided into 4 types; in which a first type is that the SVC is connected to the low voltage side of a unit transformer and the SVC executes the reactive power control; a second type is that the SVC is connected to the high voltage side of the unit transformer and the SVC executes the reactive power control; a third type is that the SVC is connected to the high voltage side of the unit transformer and the SVC executes the voltage control; and a fourth type is that the SVC is connected to the low voltage side of the unit transformer and the SVC executes the voltage control.

According to a preferred embodiment of the present invention, in the first type of the operation mode, the coordinated control method further comprises: calculating SVC reactive power reference $Q_{SVC}^*$ according to generator active power reference $P_{Gen}^*$, generator reactive power reference $Q_{Gen}^*$, and unit transformer high side voltage reference $V_H^*$; calculating generator terminal voltage reference $V_{Gen}^*$ according to generator active power reference $P_{Gen}^*$, and unit transformer high side voltage reference $V_H^*$; and sending the $Q_{SVC}^*$ to a local controller of SVC and the $V_{Gen}^*$ to an excitation voltage controller of generator.

According to a preferred embodiment of the present invention, in the second type of the operation mode, the coordinated control method further comprises: calculating generator terminal voltage reference $V_{Gen}^*$ according to generator active power reference $P_{Gen}^*$, generator reactive power reference $Q_{Gen}^*$, and unit transformer high side voltage reference $V_H^*$; calculating SVC reactive power output reference $Q_{SVC}^*$ according to generator active power reference $P_{Gen}^*$, generator reactive power reference $Q_{Gen}^*$, unit transformer high side voltage reference $V_H^*$, and generator terminal voltage reference $V_{Gen}^*$, and sending the $Q_{SVC}^*$ to a local controller of SVC and the $V_{Gen}^*$ to an excitation voltage controller of generator.

According to a preferred embodiment of the present invention, in the first type and/or second type of the operation mode, the coordinated control method can also comprise: setting generator terminal voltage reference $V_{Gen}^*$ according to unit transformer low side voltage reference $V_L^*$; calculating SVC reactive power reference $Q_{SVC}^*$ according to generator active power reference $P_{Gen}^*$, generator reactive power reference $Q_{Gen}^*$, and generator terminal voltage reference $V_{Gen}^*$, and sending the $Q_{SVC}^*$ to a local controller of SVC and the $V_{Gen}^*$ to an excitation voltage controller of generator.

According to a preferred embodiment of the present invention, in the third type of the operation mode, the coordinated control method further comprises: setting SVC voltage reference $V_{SVC}^*$ according to unit transformer high side voltage reference $V_H^*$; calculating generator terminal voltage reference $V_{Gen}^*$ according to generator active power reference $P_{Gen}^*$, generator reactive power reference $Q_{Gen}^*$, and SVC voltage reference $V_{SVC}^*$, and sending the $V_{SVC}^*$ to a local controller of SVC and the $V_{Gen}^*$ to an excitation voltage controller of generator.

According to a preferred embodiment of the present invention, in the third type of the operation mode, the coordinated control method can also comprise: setting generator terminal voltage reference $V_{Gen}^*$ according to unit transformer low side voltage reference $V_L^*$; calculating SVC voltage reference $V_{SVC}^*$ according to generator active power reference $P_{Gen}^*$, generator reactive power reference $Q_{Gen}^*$, and generator terminal voltage reference $V_{Gen}^*$, and sending the $V_{SVC}^*$ to a local controller of SVC and the $V_{Gen}^*$ to an excitation voltage controller of generator.

According to a preferred embodiment of the present invention, in the fourth type of the operation mode, the coordinated control method further comprises: calculating SVC voltage reference $V_{SVC}^*$ according to generator active power reference $P_{Gen}^*$ and unit transformer high side voltage reference $V_H^*$; calculating generator terminal voltage reference $V_{Gen}^*$ according to generator active power reference $P_{Gen}^*$ and unit transformer high side voltage reference $V_H^*$; and sending the $V_{SVC}^*$ to a local controller of SVC and the $V_{Gen}^*$ to an excitation voltage controller of generator.

According to a preferred embodiment of the present invention, in the fourth type of the operation mode, the coordinated control method can also comprise: setting SVC voltage reference $V_{SVC}^*$ according to unit transformer low side voltage reference $V_L^*$; setting generator terminal voltage reference $V_{Gen}^*$ according to unit transformer low side voltage reference $V_L^*$; and sending the $V_{SVC}^*$ to a local controller of SVC and the $V_{Gen}^*$ to an excitation voltage controller of generator.

According to a preferred embodiment of the present invention, the generator terminal voltage reference $V_{Gen}^*$ can also comprise a generator side feedback component calculated by generator reactive power closed-loop controller.

According to a preferred embodiment of the present invention, the SVC reactive power reference $Q_{SVC}^*$ and/or SVC voltage reference $V_{SVC}^*$ can also comprise a SVC side feedback component calculated by generator reactive power closed-loop controller.

According to a preferred embodiment of the present invention, the generator terminal voltage reference $V_{Gen}^*$ can also comprise a generator side droop component calculated by generator reactive power droop controller for the fourth type of operation mode.

According to a preferred embodiment of the present invention, the SVC voltage reference $V_{SVC}^*$ can also comprise a SVC side droop component calculated by SVC reactive power droop controller for the fourth type of the operation mode.

According to the other aspect of the present invention, it provides a coordinated controller for controlling generator and SVC. The coordinated controller comprises: a measuring module, configured to measure the required input parameters for the generator and SVC control; a judging module, configured to judge the system topology and the control mode of SVC to determine the operation mode; and a calculating module, configured to calculate the control reference based on the chosen operation mode to control the generator and/or SVC.

According to a preferred embodiment of the present invention, the operation mode can be divided into 4 types; in which a first type is that the SVC is connected to the low voltage side of a unit transformer and the SVC executes the reactive power control; a second type is that the SVC is connected to the high voltage side of the unit transformer and the SVC executes the reactive power control; a third type is that the SVC is connected to the high voltage side of the unit transformer and the SVC executes the voltage control; and a fourth type is that the SVC is connected to the low voltage side of the unit transformer and the SVC executes the voltage control.

According to a preferred embodiment of the present invention, in the first type of the operation mode, the calculating module is further configured to: calculate SVC reactive power reference $Q_{SVC}^*$ according to generator active power reference $P_{Gen}^*$, generator reactive power reference $Q_{Gen}^*$, and unit transformer high side voltage reference $V_H^*$; calculate generator terminal voltage reference $V_{Gen}^*$ according to generator active power reference $P_{Gen}^*$, and unit transformer high side voltage reference $V_H^*$; and a sending module is configured to send the $Q_{SVC}^*$ to a local controller of SVC and the $V_{Gen}^*$ to an excitation voltage controller of generator.

According to a preferred embodiment of the present invention, in the second type of the operation mode, the calculating module is further configured to: calculate generator terminal voltage reference $V_{Gen}^*$ according to generator active power reference $P_{Gen}^*$, generator reactive power reference $Q_{Gen}^*$, and unit transformer high side voltage reference $V_H^*$; calculate SVC reactive power output reference $Q_{SVC}^*$ according to generator active power reference $P_{Gen}^*$, generator reactive power reference $Q_{Gen}^*$, unit transformer high side voltage reference $V_H^*$, and generator terminal voltage reference $V_{Gen}^*$, and a sending module is configured to send the $Q_{SVC}^*$ to a local controller of SVC and the $V_{Gen}^*$ to an excitation voltage controller of generator.

According to a preferred embodiment of the present invention, in the first type and/or second type of the operation mode, a setting module is configured to set generator terminal voltage reference $V_{Gen}^*$ according to unit transformer low side voltage reference $V_L^*$; the calculating module is further configured to calculate SVC reactive power reference $Q_{SVC}^*$ according to generator active power reference $P_{Gen}^*$, generator reactive power reference $Q_{Gen}^*$, and generator terminal voltage reference $V_{Gen}^*$, and a sending module is configured to send the $Q_{SVC}^*$ to a local controller of SVC and the $V_{Gen}^*$ to an excitation voltage controller of generator.

According to a preferred embodiment of the present invention, in the third type of the operation mode, a setting module is configured to set SVC voltage reference $V_{SVC}^*$ according to unit transformer high side voltage reference $V_H^*$; the calculating module is further configured to calculate generator terminal voltage reference $V_{Gen}^*$ according to generator active power reference $P_{Gen}^*$, generator reactive power reference $Q_{Gen}^*$, and SVC voltage reference $V_{SVC}^*$, and a sending module is configured to send the $V_{SVC}^*$ to a local controller of SVC and the $V_{Gen}^*$ to an excitation voltage controller of generator.

According to a preferred embodiment of the present invention, in the third type of the operation mode, a setting module is configured to set generator terminal voltage reference $V_{Gen}^*$ according to unit transformer low side voltage reference $V_L^*$; a calculating module is further configured to calculate SVC voltage reference $V_{SVC}^*$ according to generator active power reference $P_{Gen}^*$, generator reactive power reference $Q_{Gen}^*$, and generator terminal voltage reference $V_{Gen}^*$, and a sending module is configured to send the $V_{SVC}^*$ to a local controller of SVC and the $V_{Gen}^*$ to an excitation voltage controller of generator.

According to a preferred embodiment of the present invention, in the fourth type of the operation mode, a calculating module is further configured to: calculate SVC voltage reference $V_{SVC}^*$ according to generator active power reference $P_{Gen}^*$ and unit transformer high side voltage reference $V_H^*$; calculate generator terminal voltage reference $V_{Gen}^*$ according to generator active power reference $P_{Gen}^*$ and unit transformer high side voltage reference $V_H^*$; and a sending module is configured to send the $V_{SVC}^*$ to a local controller of SVC and the $V_{Gen}^*$ to an excitation voltage controller of generator.

According to a preferred embodiment of the present invention, in the fourth type of the operation mode, a setting module is further configured to set SVC voltage reference $V_{SVC}^*$ according to unit transformer low side voltage reference $V_L^*$; set generator terminal voltage reference $V_{Gen}^*$ according to unit transformer low side voltage reference $V_L^*$; and a sending module is configured to send the $V_{SVC}^*$ to a local controller of SVC and the $V_{Gen}^*$ to an excitation voltage controller of generator.

According to a preferred embodiment of the present invention, the generator terminal voltage reference $V_{Gen}^*$ can also comprise a generator side feedback component calculated by generator reactive power closed-loop controller.

According to a preferred embodiment of the present invention, the SVC reactive power reference $Q_{SVC}^*$ and/or SVC voltage reference $V_{SVC}^*$ can also comprise a SVC side feedback component calculated by generator reactive power closed-loop controller.

According to a preferred embodiment of the present invention, the generator terminal voltage reference $V_{Gen}^*$ can also comprise a generator side droop component calculated by generator reactive power droop controller for the fourth type of the operation mode.

According to a preferred embodiment of the present invention, the SVC voltage reference $V_{SVC}^*$ can also comprise a SVC side droop component calculated by SVC reactive power droop controller for the fourth type of the operation mode.

According to another aspect of the present invention, it provides a power plant with SVC. The power plant comprises: at least one generator unit and corresponding unit transformer, which are connected to the large electrical power system at the high voltage side of the unit transformer; in which the generator is connected to the low voltage side of the unit transform; at least one SVC which can be connected to either low voltage side or high voltage side of the unit transformer; and a coordinated controller which controls the voltage and/or reactive power of the SVC, and the voltage and/or reactive power of the generator unit, according to any one of previous embodiments.

According to a preferred embodiment of the present invention, the SVC further comprises a thyristor-based static Var compensator or voltage source converter based static Var compensator.

According to a preferred embodiment of the present invention, the generator unit further comprises at least two local controllers for generator excitation voltage control and active power control; and the SVC further comprises local controller for voltage and/or reactive power control.

According to a preferred embodiment of the present invention, the coordinated controller is interfaced with the local controllers of the generator unit and the SVC.

Embodiments of the present invention provide methods for coordinating generator and SVC to improve power plant active power throughput and coordinated controller thereof, which install the SVC at the generation side so as to take full utilization of the generation facility, and therefore improve the active power throughput capability of the power plant.

BRIEF DESCRIPTION OF THE DRAWINGS

The subject matter of the invention will be explained in more details in the following description with reference to preferred exemplary embodiments which are illustrated in the drawings, in which.

DETAILED DESCRIPTION OF EMBODIMENTS

Exemplary embodiments of the present invention are described in conjunction with the accompanying drawings hereinafter. For the sake of clarity and conciseness, not all the features of actual implementations are described in the specification.

Before describing the proposed method of the present invention, prior methods for operating two devices are briefly described for better understanding the innovation.

Figure 1A:
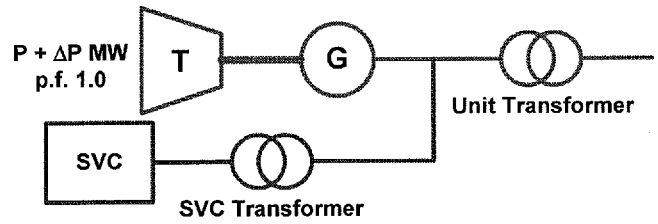
FIG. 1A illustrates a type of main circuit topologies when installing SVC on the LV side of an unit transformer with SVC transformer.
Figure 1B:
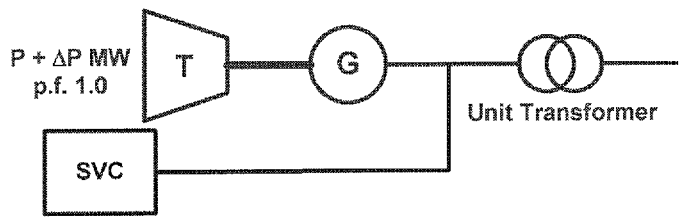
FIG. 1B illustrates a type of main circuit topologies when installing SVC on the LV side of unit transformer without SVC transformer.
Figure 1C:
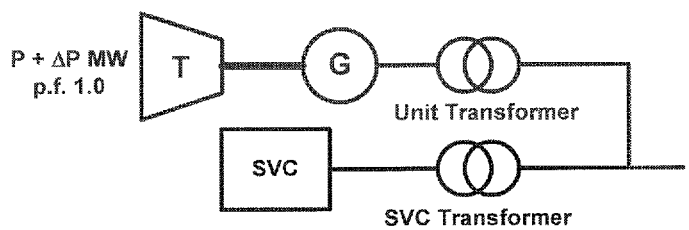
FIG. 1C illustrates a type of main circuit topologies when installing SVC on the HV side of unit transformer with SVC transformer.
Figure 1D:
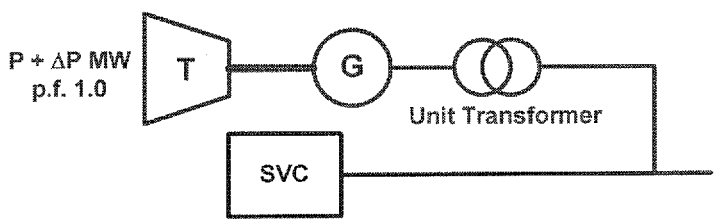
FIG. 1D illustrates a type of main circuit topologies when installing SVC on the HV side of unit transformer without SVC transformer.

FIG. 1 illustrates 4 types of main circuit topologies when installing SVC at the generator side of a power plant, in which SVC on the LV side of an unit transformer with SVC transformer in FIG. 1A, SVC on the LV side of unit transformer without SVC transformer in FIG. 1B, SVC on the HV side of unit transformer with SVC transformer in FIG. 1C and SVC on the HV side of unit transformer without SVC transformer in FIG. 1D.

As shown in FIG. 1, SVC can be connected either to the low voltage side of the unit transformer (i.e. FIGS. 1A and 1B) or the high voltage side of the unit transformer (i.e. FIGS. 1C and 1D).

For the SVC on the LV side of unit transformer topologies, it is possible to save the SVC transformer because the terminal voltage of the generator is usually in the range of 10~20 kV. But the unit transformer may require special design in order to block the harmonics from the SVC. For the SVC on the HV side of unit transformer topologies, SVC transformer is usually necessary in order to match the high side voltage of the unit transformer, which is usually 220~500 kV for large-scale coal-fired power plant. But with the development of SVC, the topology shown in FIG. 1D is also a practical way.

Figure 2:
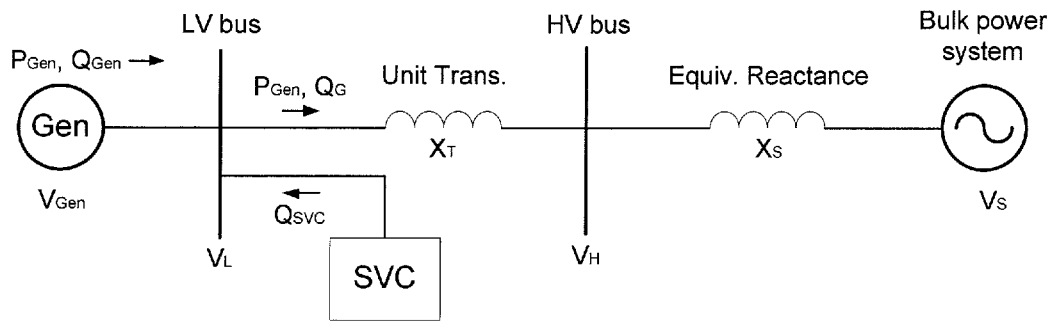
FIG. 2 illustrates an equivalent circuit when SVC is installed on the LV side.

As illustrated in FIG. 1, by installing SVC, the generator is able to operate at unity power factor so as to increase the active power capability of the power plant. However, it should be noted that the required reactive power outputs from the SVC to achieve the same target are different under these four topologies. Details to determine the operation point of the SVC to achieve unity (or any desired) power factor operation of the generator will be introduced below:

FIG. 2 illustrates an equivalent circuit when SVC is installed on the LV side.

When SVC is connected to the LV side of the unit transformer, the equivalent circuit of the system is shown in FIG. 2, where $P_{Gen}$ and $Q_{Gen}$ are the active and reactive power output from the generator; $Q_{SVC}$ is the reactive power output from the SVC; $Q_G$ is the total reactive power flow through the unit transformer, $Q_G=Q_{Gen}+Q_{SVC}$; $X_T$ and $X_S$ represent the reactance of unit transformer and equivalent reactance of the transmission system; $V_{Gen}$ and $V_L$ represent the generator terminal voltage and the unit transformer low side voltage, $V_{Gen}=V_L$; and $V_S$ represents the Thevenin voltage of the bulk power system respectively.

Given the equivalent circuit, the active and the reactive power at the low voltage side of the unit transformer can be expressed as (1), where represents the phase angle of the unit transformer LV bus voltage with respective to the voltage of the bulk power system.

$$\begin{cases} P_{Gen} = \dfrac{V_L V_S}{X_T + X_S} \sin\delta \\ Q_G = \dfrac{V_L^2}{X_T + X_S} - \dfrac{V_L V_S}{X_T + X_S} \cos\delta \end{cases} \quad (1)$$

Since $\cos\delta = \sqrt{1-\sin^2\delta}$, the expression of reactive power $Q_G$ can be obtained as follows:

$$Q_G = \dfrac{V_L^2 - \sqrt{V_L^2 V_S^2 - P_{Gen}^2 (X_T + X_S)^2}}{X_T + X_S} \quad (2)$$

Considering $Q_G=Q_{Gen}+Q_{SVC}$, in order to fully compensate the reactive power output from the generator, we have $$Q_{SVC} = Q_G = \dfrac{V_L^2 - \sqrt{V_L^2 V_S^2 - P_{Gen}^2 (X_T + X_S)^2}}{X_T + X_S} \quad (3)$$

Figure 3:
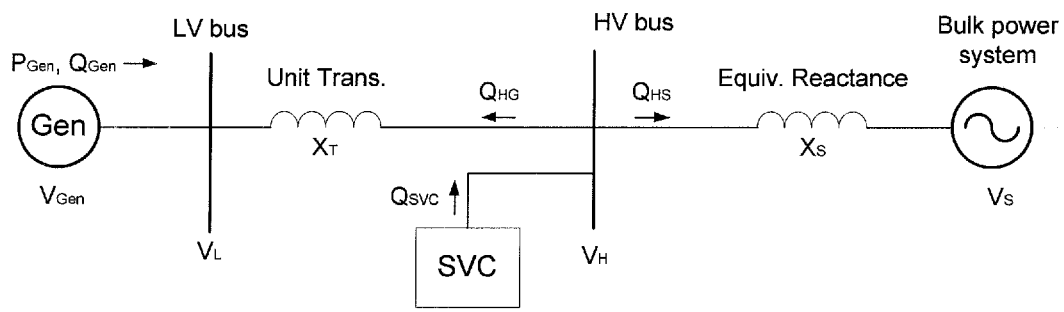
FIG. 3 illustrates an equivalent circuit when SVC is connected to the HV side of the unit transformer.

FIG. 3 illustrates an equivalent circuit when SVC is connected to the HV side of the unit transformer. As shown in FIG. 3, the reactive power output from SVC can be divided into two parts, $Q_{SVC}=Q_{HG}+Q_{HS}$, other parameter definitions are the same as that of FIG. 2.

If only considering the power flow between the LV bus and the HV bus of the unit transformer, we can obtain the expression of reactive power $Q_{Gen}$ as follows:

$$Q_{Gen} = \dfrac{V_L^2 - \sqrt{V_L^2 V_H^2 - P_{Gen}^2 X_T^2}}{X_T} \quad (4)$$

In order to fully compensate the reactive power output from the generator, $Q_{Gen}$ should be equal to zero, i.e. there will be no reactive power exchange between the generator and the unit transformer, which means the reactive power demand of the unit transformer should be balanced by $Q_{HG}$. Thus we have:

$$Q_{HG} = \dfrac{P_{Gen}^2 X_T}{V_L^2} \quad (5)$$

Furthermore, by setting the $Q_{Gen}$ in equation (4) to zero, we can derive the closed form expression for the value of $V_H$ to which the SVC must regulate in order to make the generator operate at unity power factor. This expression is:

$$V_H = \sqrt{V_L^2 + \left(\dfrac{P_{Gen} X_T}{V_L}\right)^2} \quad (6)$$

With the expression of $V_H$, we can calculate the power flow between the HV bus of the unit transformer and the power source, and thus obtain the expression of reactive power $Q_{HS}$:

$$Q_{HS} = \dfrac{V_H^2 - \sqrt{V_H^2 V_S^2 - P_{Gen}^2 X_S^2}}{X_S} \quad (7)$$

Substituting the result of (6) into (7), we have:

$$Q_{HS} = \dfrac{\left(V_L^2 + \dfrac{P_{Gen}^2 X_T^2}{V_L^2}\right) - \sqrt{V_S^2\left(V_L^2 + \dfrac{P_{Gen}^2 X_T^2}{V_L^2}\right) - P_{Gen}^2 X_S^2}}{X_S} \quad (8)$$

Since $Q_{SVC}=Q_{HG}+Q_{HS}$, the total reactive power that the SVC delivers under this topology is:

$$Q_{SVC} = \frac{P_{Gen}^2 X_T}{V_L^2} + \frac{\left(V_L^2 + \frac{P_{Gen}^2 X_T^2}{V_L^2}\right) - \sqrt{V_S^2\left(V_L^2 + \frac{P_{Gen}^2 X_T^2}{V_L^2}\right) - P_{Gen}^2 X_S^2}}{X_S} \quad (9)$$

Based on the analysis above, there are mainly two types of control methods considering the different control targets of SVC.

Figure 4:
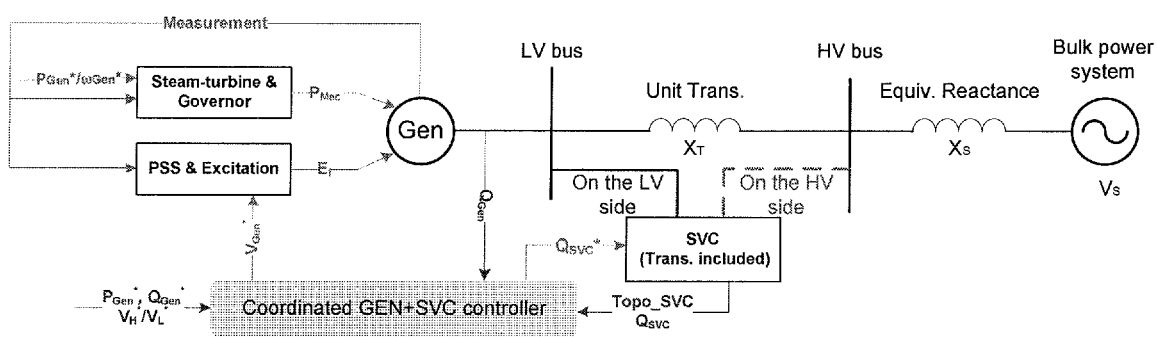
FIG. 4 illustrates a diagram of coordinated generator and SVC control system according to a preferred embodiment of the present invention.

SVC Var Control:

FIG. 4 illustrates a diagram of coordinated generator and SVC control system according to a preferred embodiment of the present invention.

As shown in FIG. 4, the SVC is under Q control mode. The governor regulates the mechanical power output from the turbine according to the active power reference $P_{Gen}^*$ or the generator speed reference $\omega_{Gen}^*$; the excitation & PSS regulate the excitation voltage according to the voltage reference $V_{Gen}^*$; and the SVC regulates its terminal reactive power output depending on the main circuit topology and its control mode according to the references and measurements defined in Table 1.

It shall be appreciated that the generator voltage reference can be given by a high level controller or manual controller according to the power plant operation scheme. And the skilled person in art can use a control method which combines a feed forward control and feedback control to generates the $Q_{SVC}^*$.

Figure 5:
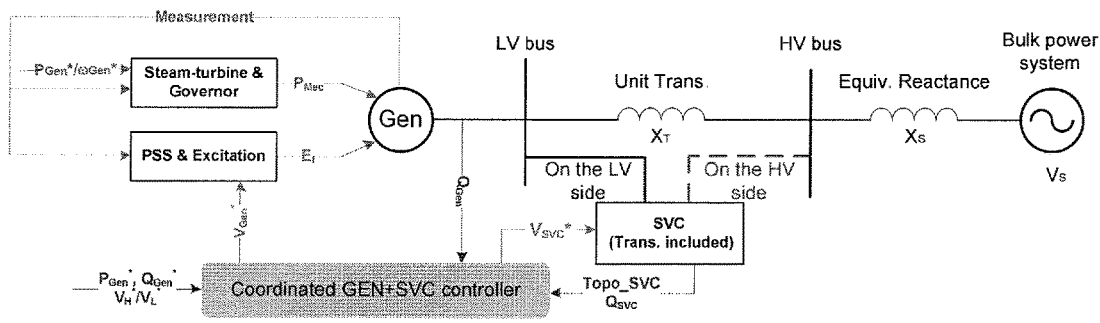
FIG. 5 illustrates a diagram of coordinated generator and SVC control system according to another preferred embodiment of the present invention.

SVC V Control:

FIG. 5 illustrates a diagram of coordinated generator and SVC control system according to another preferred embodiment of the present invention.

As shown in FIG. 5, the SVC is under V control mode. The governor regulates the mechanical power output from the turbine according to the active power reference $P_{Gen}^*$ or the generator speed reference $\omega_{Gen}^*$; the excitation & PSS regulate the excitation voltage according to the voltage reference $V_{Gen}^*$; and the SVC regulates its terminal voltage depending on the main circuit topology and its control mode according to the references and measurements defined in Table 1.

The skilled person in art knows that the generator voltage reference can be given by a high level controller or manual controller according to the power plant operation scheme. It shall be noted that a control method which combines a feed forward control and feedback control can be used to generate the $V_{SVC}^*$.

TABLE 1

Definition for the coordinated Gen + SVC controller

| | Variable | Description |
|---|---|---|
| Inputs | $P_{Gen}^*$ | Generator active power output reference |
| | $Q_{Gen}^*$ | Generator reactive power output reference |
| | $V_H^*$ | Unit transformer high side voltage reference (when unit transformer high side voltage reference is available) |
| | $V_L^*$ | Unit transformer low side voltage reference (when unit transformer low side voltage reference is available) |
| | $Q_{Gen}$ | Measured generator reactive power output |
| | $Q_{SVC}$ | Measured SVC reactive power output |
| | Topo_SVC | Main circuit topology indicator of generator and SVC system (SVC is on the LV side or the HV side) |
| | Ctrl_mode | Control mode indicator of SVC (under Var control mode or V control mode) |

TABLE 1-continued

Definition for the coordinated Gen + SVC controller

| | Variable | Description |
|---|---|---|
| Outputs | $V_{SVC}^*$ | Voltage reference for SVC when SVC is under V control mode |
| | $Q_{SVC}^*$ | Reactive power reference for SVC when SVC is under Var control mode |
| | $V_{Gen}^*$ | Voltage reference for generator excitation system |

Figure 6:
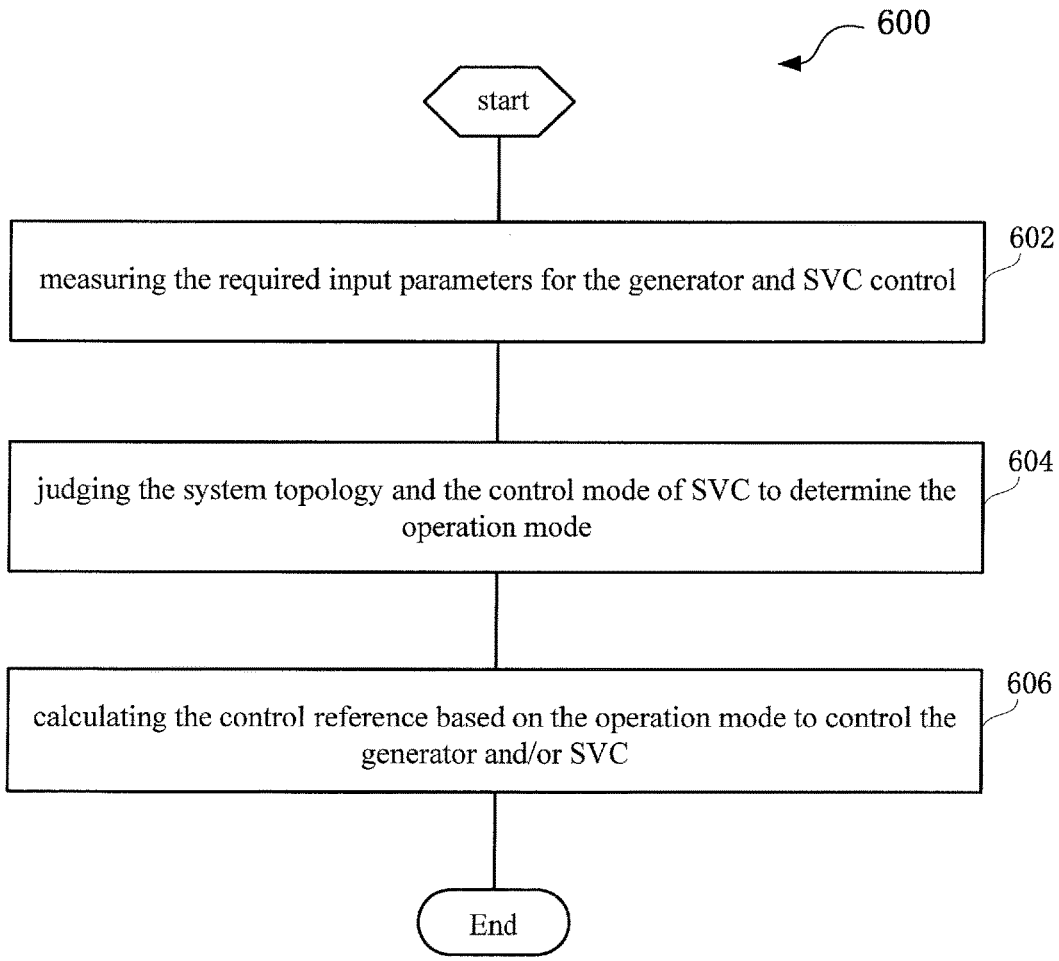
FIG. 6 illustrates a coordinated control method of generator and SVC for improving power plant active power throughput according to an embodiment of the present invention.

FIG. 6 illustrates a coordinated control method of generator and SVC for improving power plant active power throughput according to an embodiment of the present invention.

As shown in FIG. 6, the coordinated control method comprises:

Step 602, measuring the required input parameters for the generator and SVC control.

Step 604, judging the system topology and the control mode of SVC to determine the operation mode. The mentioned operation mode can be divided into 4 types; in which the first type is that the SVC is connected to the low voltage side of a unit transformer and the SVC executes the reactive power control; the second type is that the SVC is connected to the high voltage side of the unit transformer and the SVC executes the reactive power control; the third type is that the SVC is connected to the high voltage side of the unit transformer and the SVC executes the voltage control; and the fourth type is that the SVC is connected to the low voltage side of the unit transformer and the SVC executes the voltage control.

Step 606, calculating the control reference based on the operation mode to control the generator and/or SVC.

Figure 7:
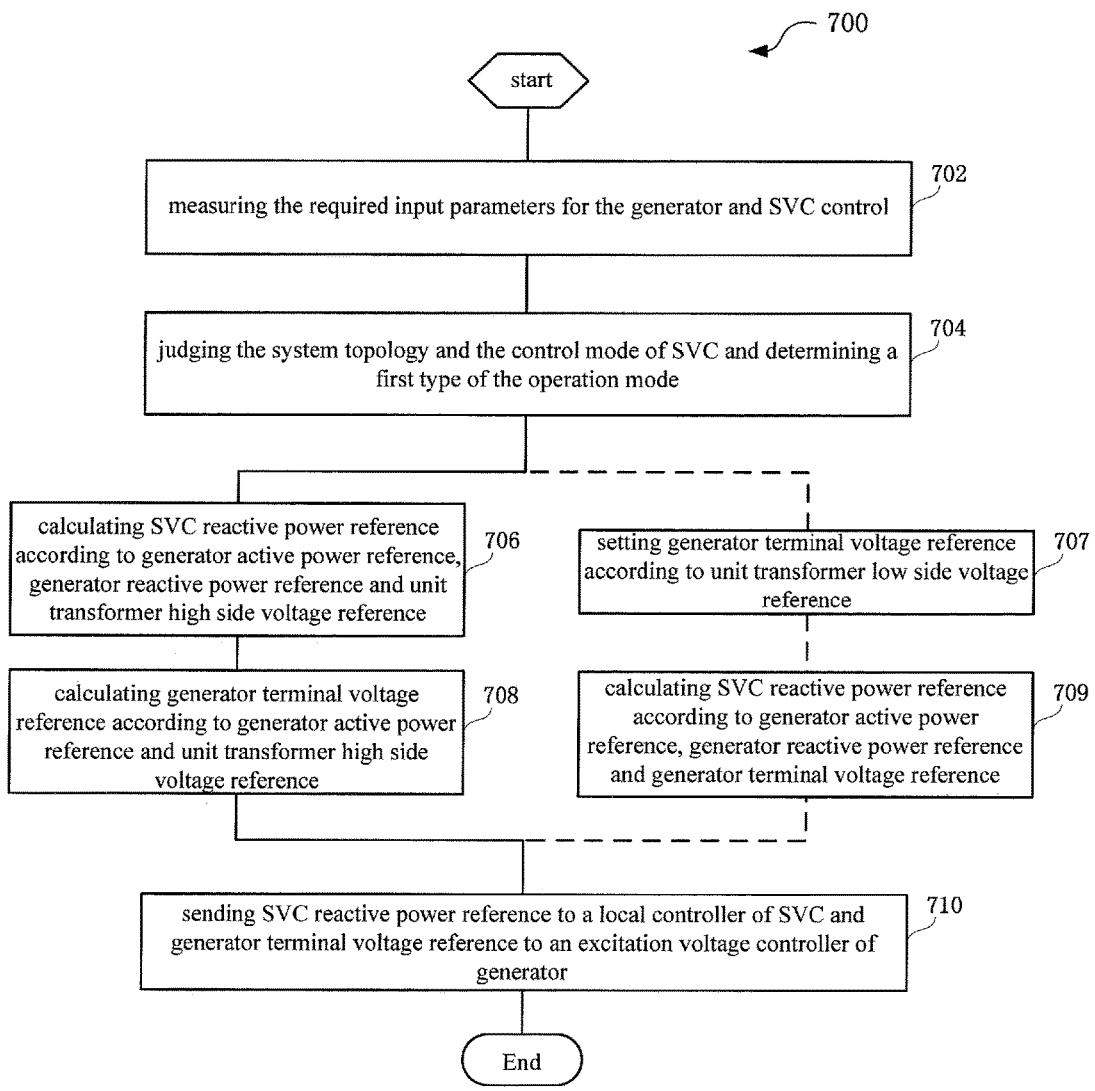
FIG. 7 illustrates a coordinated control method of generator and SVC for improving power plant active power throughput according to another preferred embodiment of the present invention.

FIG. 7 illustrates a coordinated control method of generator and SVC for improving power plant active power throughput according to another preferred embodiment of the present invention.

As shown in FIG. 7, the coordinated control method comprises steps 702-710, in which step 702 is same to step 602.

Step 704, judging the system topology and the control mode of SVC and determining that the operation mode is the first type: the SVC is connected to the low voltage side of a unit transformer and the SVC executes the reactive power control.

Step 706, calculating SVC reactive power reference $Q_{SVC}^*$ according to generator active power reference $P_{Gen}^*$, generator reactive power reference $Q_{Gen}^*$ and unit transformer high side voltage reference $V_H^*$.

Step 708, calculating generator terminal voltage reference $V_{Gen}^*$ according to generator active power reference $P_{Gen}^*$, and unit transformer high side voltage reference $V_H^*$.

Step 710, sending the $Q_{SVC}^*$ to a local controller of SVC and the $V_{Gen}^*$ to an excitation voltage controller of generator.

Figure 8:
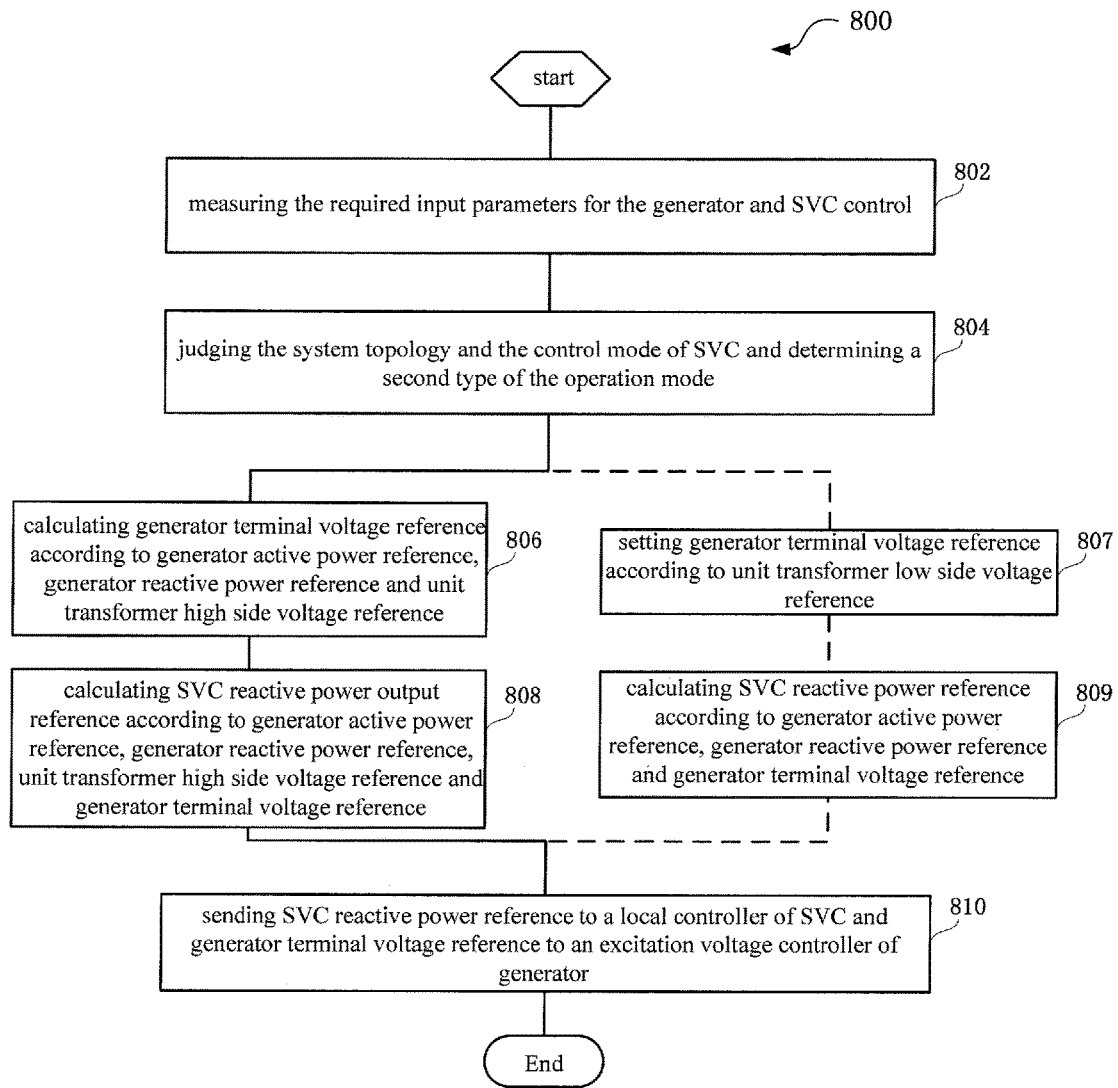
FIG. 8 illustrates a coordinated control method of generator and SVC for improving power plant active power throughput according to another preferred embodiment of the present invention.

FIG. 8 illustrates a coordinated control method of generator and SVC for improving power plant active power throughput according to another preferred embodiment of the present invention.

As shown in FIG. 8, the coordinated control method comprises steps 802-810, in which step 802 is same to step 702.

Step 804, judging the system topology and the control mode of SVC and determining that the operation mode is the second type: the SVC is connected to the high voltage side of the unit transformer and the SVC executes the reactive power control.

Step 806, calculating generator terminal voltage reference $V_{Gen}*$ according to generator active power reference $P_{Gen}*$, generator reactive power reference $Q_{Gen}*$, and unit transformer high side voltage reference $V_H*$.

Step 808, calculating SVC reactive power output reference $Q_{SVC}*$ according to generator active power reference $P_{Gen}*$, generator reactive power reference $Q_{Gen}*$, unit transformer high side voltage reference $V_H*$ and generator terminal voltage reference $V_{Gen}*$.

Step 810, sending the $Q_{SVC}*$ to a local controller of SVC and the $V_{Gen}*$ to an excitation voltage controller of generator.

In the alternative embodiments illustrated in FIGS. 7 and 8, i.e. in the first type and/or second type of the operation mode, the coordinated control method can also comprise: step 707 or step 807, setting generator terminal voltage reference $V_{Gen}*$ according to unit transformer low side voltage reference $V_L*$; step 709 or step 809, calculating SVC reactive power reference $Q_{SVC}*$ according to generator active power reference $P_{Gen}*$, generator reactive power reference $Q_{Gen}*$, and generator terminal voltage reference $V_{Gen}*$; and then sending the $Q_{SVC}*$ to a local controller of SVC and the $V_{Gen}*$ to an excitation voltage controller of generator.

Figure 9:
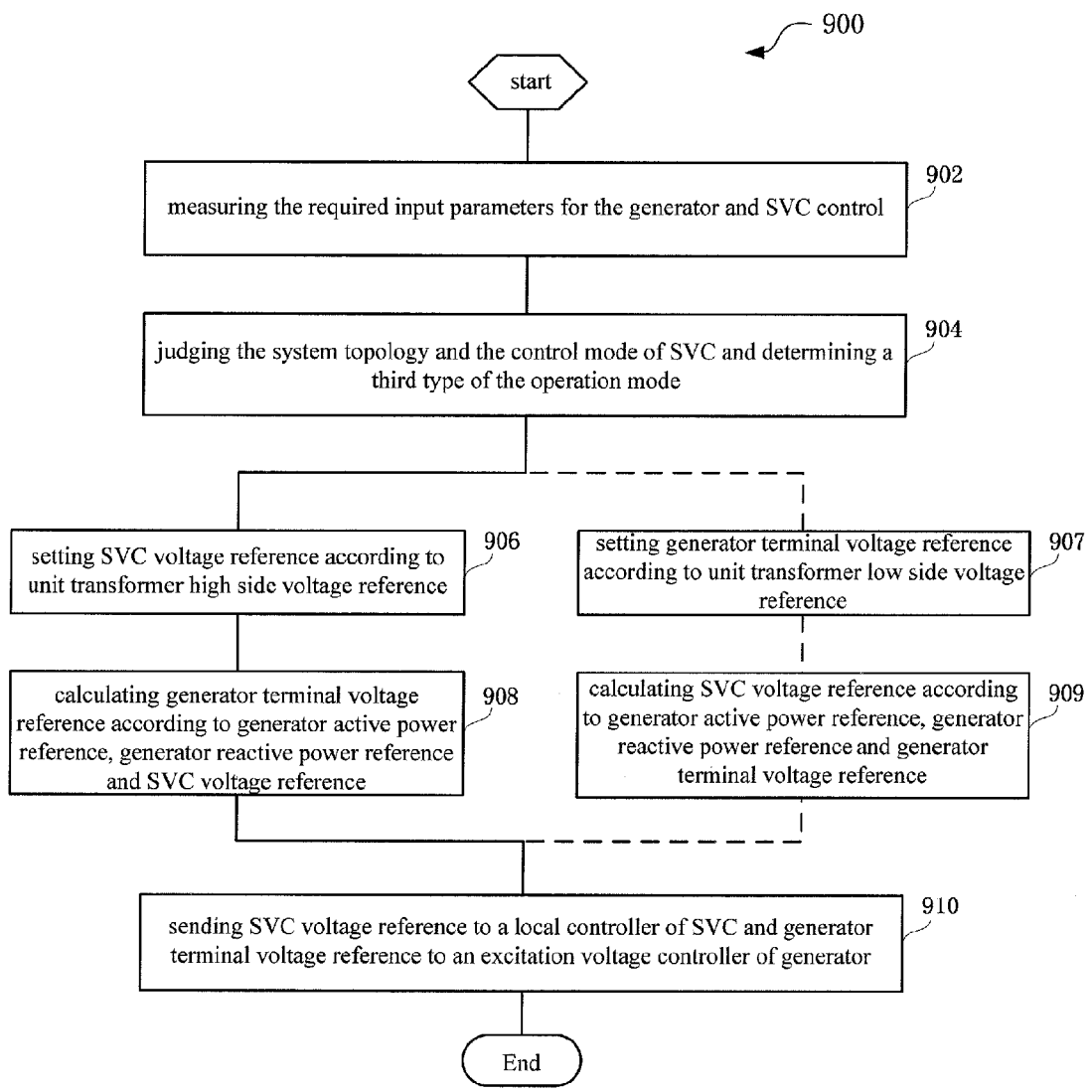
FIG. 9 illustrates a coordinated control method of generator and SVC for improving power plant active power throughput according to another preferred embodiment of the present invention.

FIG. 9 illustrates a coordinated control method of generator and SVC for improving power plant active power throughput according to another preferred embodiment of the present invention.

As shown in FIG. 9, the coordinated control method comprises steps 902-910, in which step 902 is same to step 702.

Step 904, judging the system topology and the control mode of SVC and determining that the operation mode is the third type: the SVC is connected to the high voltage side of the unit transformer and the SVC executes the voltage control. And then the method will be executed alternatively through steps 906 and 908, or steps 907 and 909 in sequence.

Step 906, setting SVC voltage reference $V_{SVC}*$ according to unit transformer high side voltage reference $V_H*$.

Step 908, calculating generator terminal voltage reference $V_{Gen}*$ according to generator active power reference $P_{Gen}*$, generator reactive power reference $Q_{Gen}*$ and SVC voltage reference $V_{SVC}*$.

Step 907, setting generator terminal voltage reference $V_{Gen}*$ according to unit transformer low side voltage reference $V_L*$.

Step 909, calculating SVC voltage reference $V_{SVC}*$ according to generator active power reference $P_{Gen}*$, generator reactive power reference $Q_{Gen}*$, and generator terminal voltage reference $V_{Gen}*$.

Step 910, sending the $V_{SVC}*$ to a local controller of SVC and the $V_{Gen}*$ to an excitation voltage controller of generator.

Figure 10:
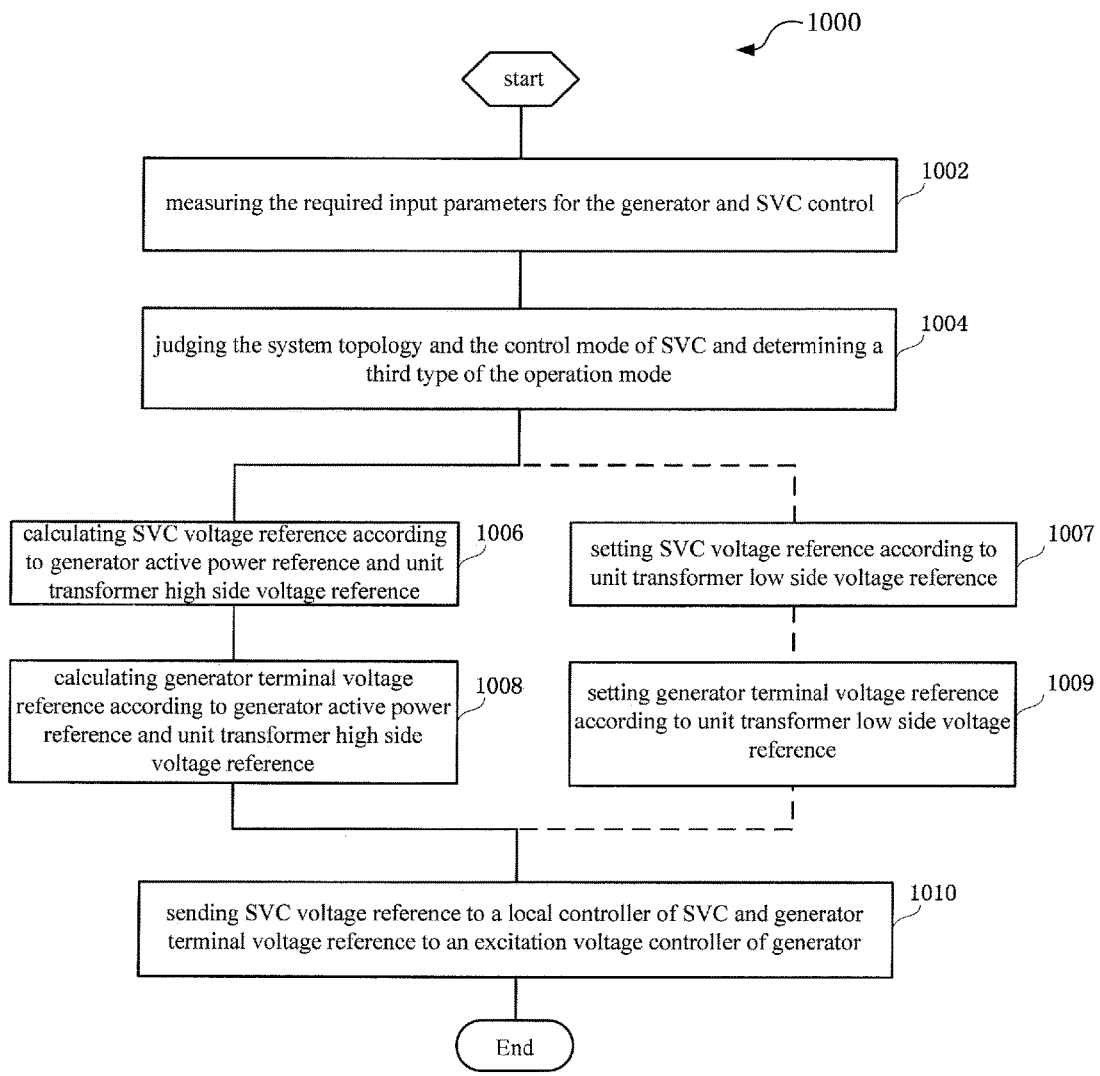
FIG. 10 illustrates a coordinated control method of generator and SVC for improving power plant active power throughput according to another preferred embodiment of the present invention.

FIG. 10 illustrates a coordinated control method of generator and SVC for improving power plant active power throughput according to another preferred embodiment of the present invention.

As shown in FIG. 10, the coordinated control method comprises steps 902-910, in which step 1002 is same to step 702.

Step 1004, judging the system topology and the control mode of SVC and determining that the operation mode is the fourth type: the SVC is connected to the low voltage side of the unit transformer and the SVC executes the voltage control. And then the method will be executed alternatively through steps 1006 and 1008, or steps 1007 and 1009 in sequence.

Step 1006, calculating SVC voltage reference $V_{SVC}*$ according to generator active power reference $P_{Gen}*$ and unit transformer high side voltage reference $V_H*$.

Step 1008, calculating generator terminal voltage reference $V_{Gen}*$ according to generator active power reference $P_{Gen}*$ and unit transformer high side voltage reference $V_H*$.

Step 1007, setting SVC voltage reference $V_{SVC}*$ according to unit transformer low side voltage reference $V_L*$.

Step 1009, setting generator terminal voltage reference $V_{Gen}*$ according to unit transformer low side voltage reference $V_L*$.

Step 1010, sending the $V_{SVC}*$ to a local controller of SVC and the $V_{Gen}*$ to an excitation voltage controller of generator.

In above mentioned embodiments, the generator terminal voltage reference $V_{Gen}*$ can also comprise a generator side feedback component calculated by generator reactive power closed-loop controller; the SVC reactive power reference $Q_{SVC}*$ and/or the SVC voltage reference $V_{SVC}*$ can also comprise a SVC side feedback component calculated by generator reactive power closed-loop controller. For the fourth type of operation mode, the generator terminal voltage reference $V_{Gen}*$ can also comprise a generator side droop component calculated by generator reactive power droop controller; the SVC voltage reference $V_{SVC}*$ can also comprise a SVC side droop component calculated by SVC reactive power droop controller.

Correspondingly, the present invention also provides a coordinated controller for controlling generator and SVC, which comprises at least a measuring module, a judging module and a calculating module. The measuring module is configured to measure the required input parameters for the generator and SVC control; the judging module is configured to judge the system topology and the control mode of SVC to determine the operation mode which can be divided into 4 types; and the calculating module is configured to calculate the control reference based on the chosen operation mode to control the generator and/or SVC.

In the first type of the operation mode, the calculating module further calculates SVC reactive power reference $Q_{SVC}*$ according to generator active power reference $P_{Gen}*$, generator reactive power reference $Q_{Gen}*$, and unit transformer high side voltage reference $V_H*$; calculates generator terminal voltage reference $V_{Gen}*$ according to generator active power reference $P_{Gen}*$, and unit transformer high side voltage reference $V_H*$. And the coordinated controller further comprises a sending module, which sends the $Q_{SVC}*$ to a local controller of SVC and the $V_{Gen}*$ to an excitation voltage controller of generator.

In the second type of the operation mode, the calculating module further calculates generator terminal voltage reference $V_{Gen}*$ according to generator active power reference $P_{en}*$, generator reactive power reference $Q_{Gen}*$, and unit transformer high side voltage reference $V_H*$; calculates SVC reactive power output reference $Q_{SVC}*$ according to generator active power reference $P_{Gen}*$, generator reactive power reference $Q_{Gen}*$, unit transformer high side voltage reference $V_H*$, and generator terminal voltage reference $V_{Gen}*$. And the coordinated controller further comprises a sending module, which sends the $Q_{SVC}*$ to a local controller of SVC and the $V_{Gen}*$ to an excitation voltage controller of generator.

In a preferred embodiment of the present invention, in the first type and/or second type of the operation mode, the coordinated controller further comprises a setting module and a sending module, in which the setting module sets the generator terminal voltage reference $V_{Gen}^*$ according to unit transformer low side voltage reference $V_L^*$; the calculating module calculates the SVC reactive power reference $Q_{SVC}^*$ according to generator active power reference $P_{Gen}^*$, generator reactive power reference $Q_{Gen}^*$, and generator terminal voltage reference $V_{Gen}^*$, and the sending module sends the $Q_{SVC}^*$ to a local controller of SVC and the $V_{Gen}^*$ to an excitation voltage controller of generator.

In the third type of the operation mode, the coordinated controller further comprises a setting module and a sending module, In which the setting module sets the SVC voltage reference $V_{SVC}^*$ according to unit transformer high side voltage reference $V_H^*$; the calculating module is further configured to calculate generator terminal voltage reference $V_{Gen}^*$ according to generator active power reference $P_{Gen}^*$, generator reactive power reference $Q_{Gen}^*$, and SVC voltage reference $V_{SVC}^*$, and the sending module sends the $V_{SVC}^*$ to a local controller of SVC and the $V_{Gen}^*$ to an excitation voltage controller of generator. In an alternative embodiment of the present invention, the setting module is to set generator terminal voltage reference $V_{Gen}^*$ according to unit transformer low side voltage reference $V_L^*$; a calculating module is further configured to calculate SVC voltage reference $V_{SVC}^*$ according to generator active power reference $P_{Gen}^*$, generator reactive power reference $Q_{Gen}^*$, and generator terminal voltage reference $V_{Gen}^*$, and the sending module sends the $V_{SVC}^*$ to a local controller of SVC and the $V_{Gen}^*$ to an excitation voltage controller of generator.

In the fourth type of the operation mode, the calculating module further calculates SVC voltage reference $V_{SVC}^*$ according to generator active power reference $P_{Gen}^*$ and unit transformer high side voltage reference $V_H^*$; calculates generator terminal voltage reference $V_{Gen}^*$ according to generator active power reference $P_{Gen}^*$ and unit transformer high side voltage reference $V_H^*$; and the coordinated controller further comprises a sending module, which sends the $V_{SVC}^*$ to a local controller of SVC and the $V_{Gen}^*$ to an excitation voltage controller of generator. In an alternative embodiment of the present invention, the setting module is to set both of the generator terminal voltage reference $V_{Gen}^*$ and SVC voltage reference $V_{SVC}^*$ according to unit transformer low side voltage reference $V_L^*$; and the sending module sends the $V_{SVC}^*$ to a local controller of SVC and the $V_{Gen}^*$ to an excitation voltage controller of generator.

The present invention also provides a power plant with SVC, which comprises at least one generator unit and corresponding unit transformer, and at least one SVC; moreover the generator unit and unit transformer are connected to the large electrical power system at the high voltage side of the unit transformer; in which the generator is connected to the low voltage side of the unit transform; the SVC which can be connected to either low voltage side or high voltage side of the unit transformer; and a coordinated controller which controls the voltage and/or reactive power of the SVC, and the voltage and/or reactive power of the generator unit, according to any one of previous embodiments. Generally, the coordinated controller is interfaced with the local controllers of the generator unit and the SVC.

In a preferred embodiment of the present invention, the SVC further comprises a thyristor-based static Var compensator or voltage source converter based static Var compensator. The generator unit further comprises at least two local controllers for generator excitation voltage control and active power control; and the SVC further comprises local controller for voltage and/or reactive power control.

Compared with the existing prior arts, the proposed solution of the present invention installs the SVC at the generation side and can take full utilization of the generation facility; therefore the active power throughput capability of the power plant can be greatly improved. Referring to the description of the exemplary embodiments, those skilled in the art appreciate the advantages of the present invention: the generator and the SVC can be controlled in a coordinated way under different system topologies or with different operation modes of SVC. Moreover, the generator can also be converted into a "unity power factor generator" in the full operation range without affecting the stable operation.

Though the present invention has been described on the basis of some preferred embodiments, those skilled in the art should appreciate that those embodiments should by no means limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A coordinated control method of a power plant including a generator and a Static Var Compensator (SVC), comprising:
   measuring required input parameters for said generator and an SVC control with a coordinated controller for the power plant, wherein the coordinated controller is operative to provide coordinated control of the generator and the SVC;
   judging a system topology and a control mode of the SVC control to determine an operation mode with the coordinated controller;
   calculating a control reference based on said operation mode to control said generator and/or the SVC control with the coordinated controller; and
   operating one or both of the generator and the SVC with the coordinated controller using the control reference so as to increase power plant active power throughput,
   wherein said operation mode is divided into four (4) types, wherein a first type of the operation mode is that said SVC is connected to a low voltage side of a unit transformer and said SVC control executes a reactive power control, wherein a second type of the operation mode is that said SVC control is connected to a high voltage side of said unit transformer and said SVC control executes the reactive power control, wherein a third type of the operation mode is that said SVC control is connected to the high voltage side of said unit transformer and said SVC control executes a voltage control, wherein a fourth type of the operation mode is that said SVC control is connected to the low voltage side of said unit transformer and said SVC control executes the voltage control.

2. The coordinated control method according to claim 1, wherein in said first type of the operation mode, said coordinated control method further comprises:
   calculating an SVC reactive power reference according to a generator active power reference, generator reactive power reference, and a unit transformer high side voltage reference;
   calculating a generator terminal voltage reference according to the generator active power reference, and the unit transformer high side voltage reference; and sending said SVC reactive power reference to a local controller of SVC control and said generator terminal voltage reference to an excitation voltage controller of the generator.

3. The coordinated control method according to claim 2, wherein said generator terminal voltage reference further comprises a generator side feedback component calculated by a generator reactive power closed-loop controller.

4. The coordinated control method according to claim 2, wherein the SVC reactive power reference and/or an SVC voltage reference further comprises an SVC side feedback component calculated by a generator reactive power closed-loop controller.

5. The coordinated control method according to claim 1, wherein in said second type of the operation mode, said coordinated control method further comprises:
  calculating a generator terminal voltage reference according to generator active power reference, a generator reactive power reference, and a unit transformer high side voltage reference;
  calculating an SVC reactive power output reference according to the generator active power reference, the generator reactive power reference, a unit transformer high side voltage reference, and the generator terminal voltage reference, and
  sending said SVC reactive power reference to a local controller of SVC and said generator terminal voltage reference to an excitation voltage controller of the generator.

6. The coordinated control method according to claim 1, wherein in said first type of the operation mode and/or said second type of the operation mode, said coordinated control method further comprises:
  setting a generator terminal voltage reference according to unit transformer low side voltage reference;
  calculating an SVC reactive power reference according to a generator active power reference, a generator reactive power reference, and a generator terminal voltage reference, and
  sending said SVC reactive power reference to a local controller of the SVC and said generator terminal voltage reference to an excitation voltage controller of generator.

7. The coordinated control method according to claim 1, wherein in said third type of the operation mode, said coordinated control method further comprises:
  setting an SVC voltage reference according to a unit transformer high side voltage reference;
  calculating a generator terminal voltage reference according to generator active power reference, a generator reactive power reference, and an SVC voltage reference; and
  sending said SVC voltage reference to a local controller of the SVC and said generator terminal voltage reference to an excitation voltage controller of the generator.

8. The coordinated control method according to claim 1, wherein in said third type of the operation mode, said coordinated control method can also comprise:
  setting the generator terminal voltage reference according to unit transformer low side voltage reference;
  calculating an SVC voltage reference according to a generator active power reference, a generator reactive power reference, and a generator terminal voltage reference, and
  sending said SVC voltage reference to a local controller of SVC and said generator terminal voltage reference to an excitation voltage controller of the generator.

9. The coordinated control method according to claim 1, wherein in said fourth type of the operation mode, said coordinated control method further comprises:
  calculating SVC voltage reference according to a generator active power reference and a unit transformer high side voltage reference;
  calculating a generator terminal voltage reference according to the generator active power reference and the unit transformer high side voltage reference; and
  sending said SVC voltage reference to a local controller of SVC and said generator terminal voltage reference to an excitation voltage controller of generator.

10. The coordinated control method according to claim 9, wherein said generator terminal voltage reference further comprises a generator side droop component calculated by a generator reactive power droop controller for the fourth type of said operation mode.

11. The coordinated control method according to claim 9, wherein said SVC voltage reference further comprises an SVC side droop component calculated by an SVC reactive power droop controller for the fourth type of said operation mode.

12. The coordinated control method according to claim 1, wherein in said fourth type of the operation mode, said coordinated control method can also comprise:
  setting an SVC voltage reference according to a unit transformer low side voltage reference;
  setting a generator terminal voltage reference according to the unit transformer low side voltage reference; and
  sending said SVC voltage reference to a local controller of SVC and said generator terminal voltage reference to an excitation voltage controller of generator.

13. A system comprising:
  a generator and a Static Var Compensator (SVC) of a power plant;
  a controller, wherein the controller is a coordinated controller operative to provide coordinated control of the generator and the SVC; and
  an input/output structured to couple the coordinated controller to said generator and said SVC,
  wherein the coordinated controller is configured to measure required input parameters for said generator and an SVC control;
  judge a system topology and a control mode of the SVC to determine an operation mode;
  calculate a control reference based on said operation mode to control said generator and/or the SVC; and
  operate one or both of the generator and the SVC with the coordinated controller using the control reference so as to increase power plant active power throughput, wherein said operation mode is divided into four types, wherein a first type is that said SVC is connected to a low voltage side of a unit transformer and said SVC executes a reactive power control, wherein a second type is that said SVC is connected to a high voltage side of said unit transformer and said SVC executes the reactive power control, wherein a third type is that said SVC is connected to the high voltage side of said unit transformer and said SVC executes a voltage control, wherein a fourth type is that said SVC is connected to the low voltage side of said unit transformer and said SVC executes the voltage control.

14. The system according to claim 13, wherein in said first type of the operation mode, the coordinated controller is further configured to calculate an SVC reactive power reference according to a generator active power reference, a generator reactive power reference, and a unit transformer high side voltage reference; calculates generator terminal voltage reference according to the generator active power reference, and the unit transformer high side voltage reference; and the coordinated controller is configured to send said SVC reactive power reference to a local controller of SVC and said generator terminal voltage reference to an excitation voltage controller of generator.

15. The system according to claim 14, wherein said generator terminal voltage reference further comprises a generator side feedback component calculated by a generator reactive power closed-loop controller.

16. The system according to claim 14, wherein said SVC reactive power reference and/or an SVC voltage reference further comprises an SVC side feedback component calculated by a generator reactive power closed-loop controller.

17. The system according to claim 13, wherein in said second type of the operation mode, the coordinated controller is further configured to:

calculate a generator terminal voltage reference according to a generator active power reference, a generator reactive power reference, and a unit transformer high side voltage reference;

calculate an SVC reactive power output reference according to the generator active power reference, the generator reactive power reference, the unit transformer high side voltage reference, and the generator terminal voltage reference, and send said SVC reactive power output reference to a local controller of the SVC and said generator terminal voltage reference to an excitation voltage controller of generator.

18. The system according to claim 13, wherein in said first type of the operation mode and/or the second type of the operation mode, the coordinated controller is configured to set a generator terminal voltage reference according to a unit transformer low side voltage reference; calculate an SVC reactive power reference according to a generator active power reference, a generator reactive power reference, and the generator terminal voltage reference; and send said SVC reactive power reference to a local controller of the SVC and said generator terminal voltage reference to an excitation voltage controller of generator.

19. The system according to claim 13, wherein in said third type of the operation mode, the coordinated controller is further configured to set an SVC voltage reference according to a unit transformer high side voltage reference; calculate a generator terminal voltage reference according to a generator active power reference, a generator reactive power reference, and the SVC voltage reference; and send said SVC voltage reference to a local controller of the SVC and said generator terminal voltage reference to an excitation voltage controller of generator.

20. The system according to claim 13, wherein in said third type of the operation mode, the coordinated controller is further configured to set a generator terminal voltage reference according to unit transformer low side voltage reference; calculate an SVC voltage reference according to a generator active power reference, a generator reactive power reference, and the generator terminal voltage reference; and send said SVC voltage reference to a local controller of SVC and generator terminal voltage reference to an excitation voltage controller of generator.

21. The system according to claim 13, wherein in said fourth type of the operation mode, the coordinated controller is further configured to calculate SVC voltage reference according to generator active power reference and unit transformer high side voltage reference; calculate generator terminal voltage reference according to generator active power reference and unit transformer high side voltage reference; and send said SVC voltage reference to a local controller of SVC and said generator terminal voltage reference to an excitation voltage controller of generator.

22. The system according to claim 21, wherein said generator terminal voltage reference further comprises a generator side droop component calculated by a generator reactive power droop controller for the fourth type of said operation mode.

23. The system according to claim 21, wherein said SVC voltage reference further comprises an SVC side droop component calculated by an SVC reactive power droop controller for the fourth type of said operation mode.

24. The system according to claim 13, wherein in said fourth type of the operation mode, the coordinated controller is further configured to set an SVC voltage reference according to a unit transformer low side voltage reference; set a generator terminal voltage reference according to the unit transformer low side voltage reference; and send said SVC voltage reference to a local controller of SVC and said generator terminal voltage reference to an excitation voltage controller of generator.

25. A power plant with a Static Var Compensator (SVC), wherein said power plant comprises:

at least one generator unit and a corresponding unit transformer, wherein the at least one generator unit and the corresponding unit transformer are connected to an electrical power system at the high voltage side of said unit transformer; wherein said generator is connected to the low voltage side of said corresponding unit transformer;

at least one SVC connected to at least one of the low voltage side of said unit transformer and the high voltage side of said unit transformer;

a coordinated controller for controlling the at least one generator unit and the at least one SVC, wherein the coordinated controller controls a voltage of said SVC and/or the reactive power of said SVC, and the voltage of said generator unit and/or the reactive power of said generator unit, wherein said coordinated controller is operative to:

measure required input parameters for said at least one generator and an SVC control;

judge a system topology and a control mode of the SVC to determine an operation mode; and calculate a control reference based on said operation mode to control said generator and/or the SVC, wherein said operation mode is divided into four types, wherein a first type is that said SVC is connected to a low voltage side of a unit transformer and said SVC executes a reactive power control, wherein a second type is that said SVC is connected to a high voltage side of said unit transformer and said SVC executes the reactive power control, wherein a third type is that said SVC is connected to the high voltage side of said unit transformer and said SVC executes a voltage control, wherein a fourth type is that said SVC is connected to the low voltage side of said unit transformer and said SVC executes the voltage control; wherein in said fourth type of the operation mode, said coordinated controller is configured to: calculate SVC voltage reference according to generator active power reference and unit transformer high side voltage reference; calculate generator terminal voltage reference according to generator active power reference and unit transformer high side voltage reference; and send said SVC voltage reference to a local controller of said SVC and said generator terminal voltage reference to an excitation voltage controller of said at least one generator; and wherein said SVC voltage reference further comprises an SVC side droop component calculated by an SVC reactive power droop controller for the fourth type of said operation mode.

26. The power plant according to claim 25, wherein said SVC further comprises a thyristor-based static Var compensator or a voltage source converter-based static Var compensator.

27. The power plant according to claim 25, wherein said at least one generator unit further comprises at least two local controllers for the generator excitation voltage control and an active power control; and said SVC further comprises the local controller for voltage and/or reactive power control.

28. The power plant according to claim 27, wherein said coordinated controller is interfaced with said local controllers of said at least one generator unit and said SVC.

* * * * *